United States Patent
Tanaka

[11] 3,912,328
[45] Oct. 14, 1975

[54] ABDOMINAL RESTRAINT AND BELT STORAGE MEANS FOR CHILD SAFETY SEATS FOR VEHICLES

[75] Inventor: Akira Tanaka, Northridge, Calif.

[73] Assignee: American Safety Equipment Corporation, Encino, Calif.

[22] Filed: May 22, 1974

[21] Appl. No.: 472,079

[52] U.S. Cl. .................................. 297/389; 24/196
[51] Int. Cl.² .......................................... A62B 35/00
[58] Field of Search ........... 297/389, 385, 386, 384, 297/390; 280/150 SB; 244/122 R, 122 B; 24/115 J, 74 R, 196

[56] References Cited
UNITED STATES PATENTS

| | | | |
|---|---|---|---|
| 2,470,320 | 5/1949 | Page | 24/115 J |
| 2,582,787 | 1/1952 | Martin | 24/115 J |
| 3,227,489 | 1/1966 | Stubblefield | 24/196 X |
| 3,343,873 | 9/1967 | Bayon | 297/385 |
| 3,386,103 | 6/1968 | Robinson | 297/385 X |
| 3,409,949 | 11/1968 | Kobrehel et al. | 297/388 X |
| 3,606,439 | 9/1971 | Rutan | 24/196 X |
| 3,648,954 | 3/1972 | Gaylord et al. | 244/122 B |
| D202,868 | 11/1965 | Marks | 297/385 X |

*Primary Examiner*—James T. McCall

[57] ABSTRACT

A child safety seat for use in vehicles is restrained upon the vehicle seat by use of the pre-existing vehicle safety belt and has a harness assembly mounted thereto with a pair of shoulder straps adjustably connected to a crotch strap through an improved pelvic restraint means, the latter including a load bearing plate-like member including webbing snubber bars positioned in associated slots therein for adjustably anchoring the harness straps to the plate-like member and webbing storage apertures are provided in the plate-like member for receiving and storing excess webbing of the strap ends anchored to the member. A resilient material housing, having a frontal opening and cover, is provided about the plate-like member, and its associated snubber bars and strap ends, for enclosing the connecting means between the harness straps to render them inaccessible to a child passenger seated in the child seat and to present a load spreading flexible surface of smooth contour toward the pelvic area of the child passenger.

6 Claims, 9 Drawing Figures

U.S. Patent   Oct. 14, 1975   Sheet 1 of 2   3,912,328
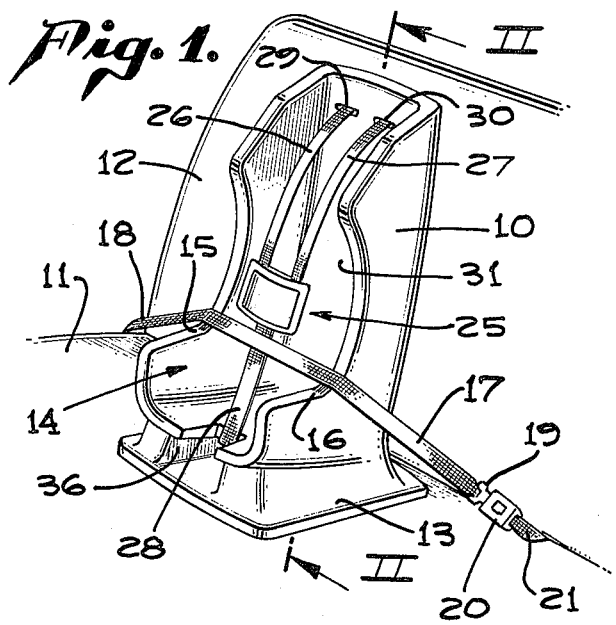
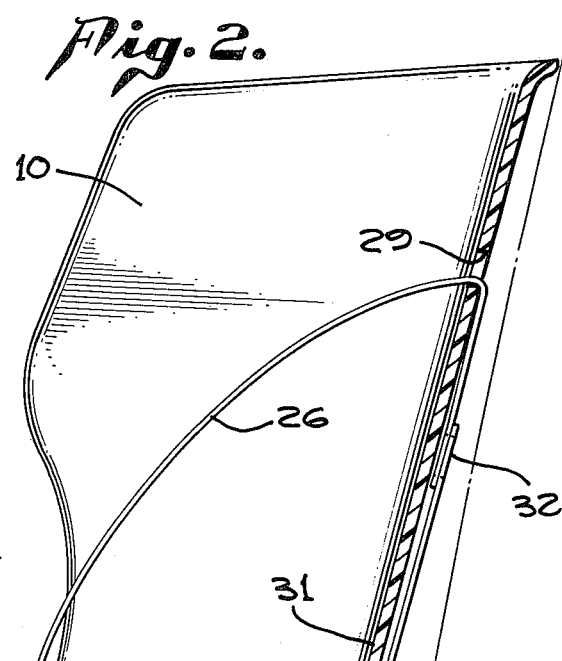
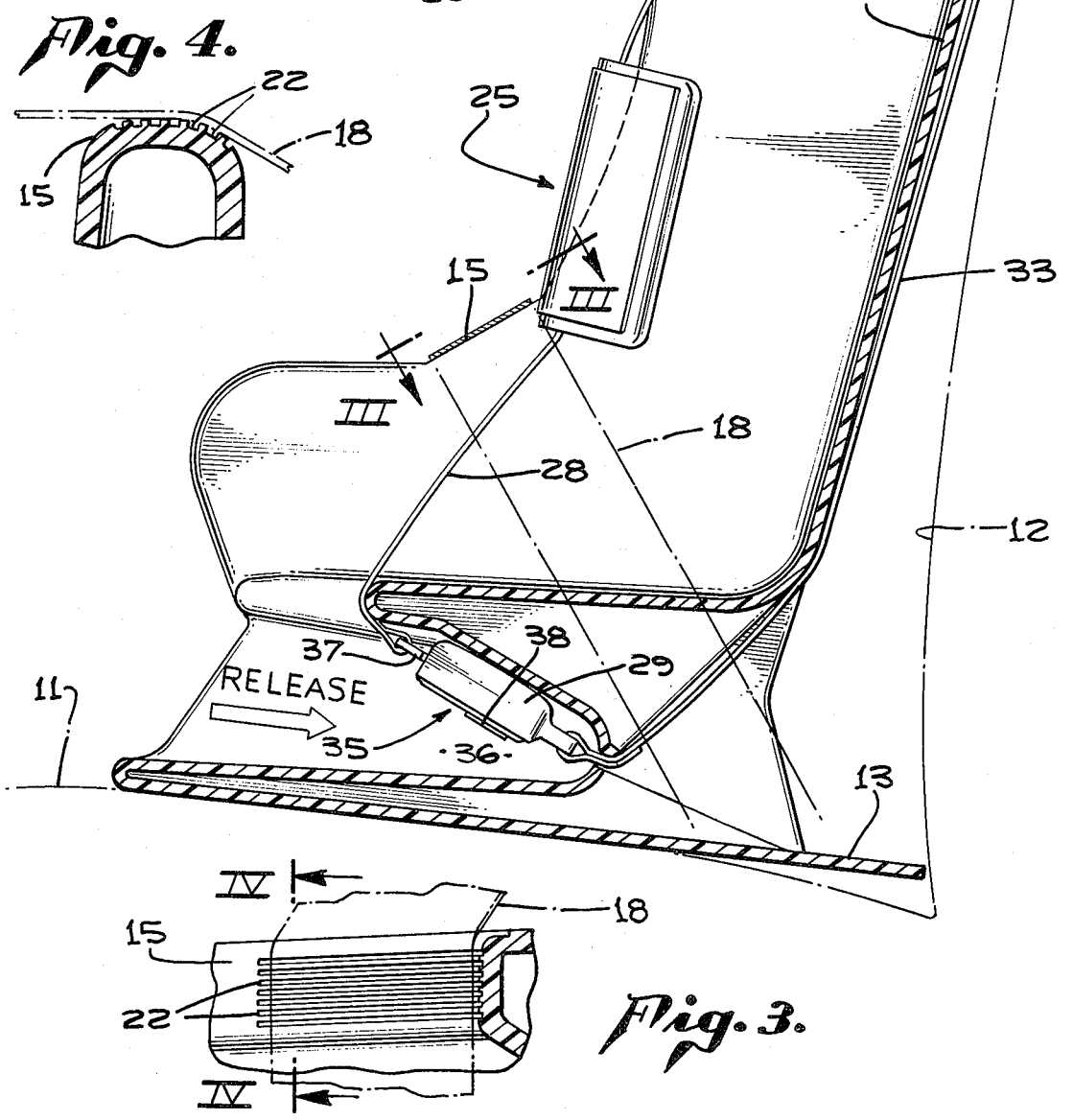

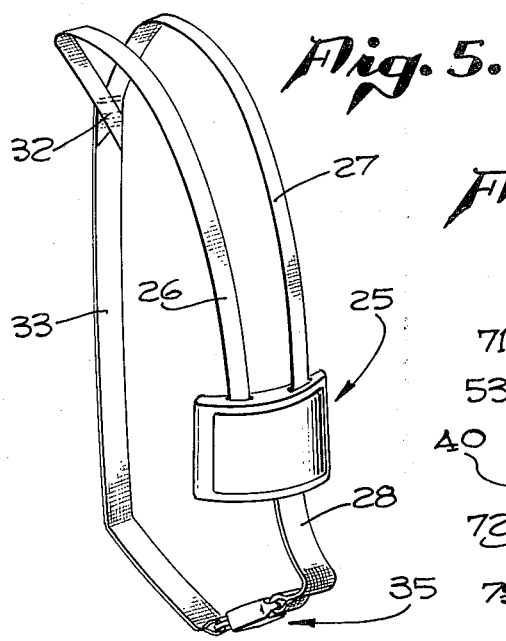
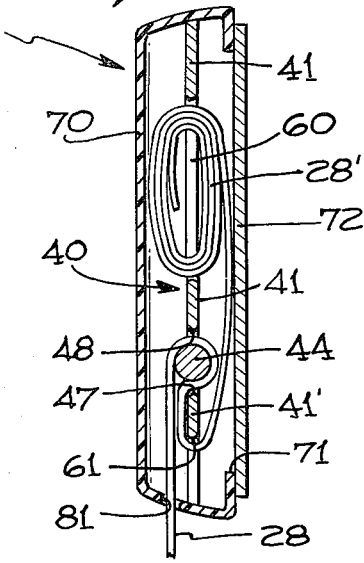
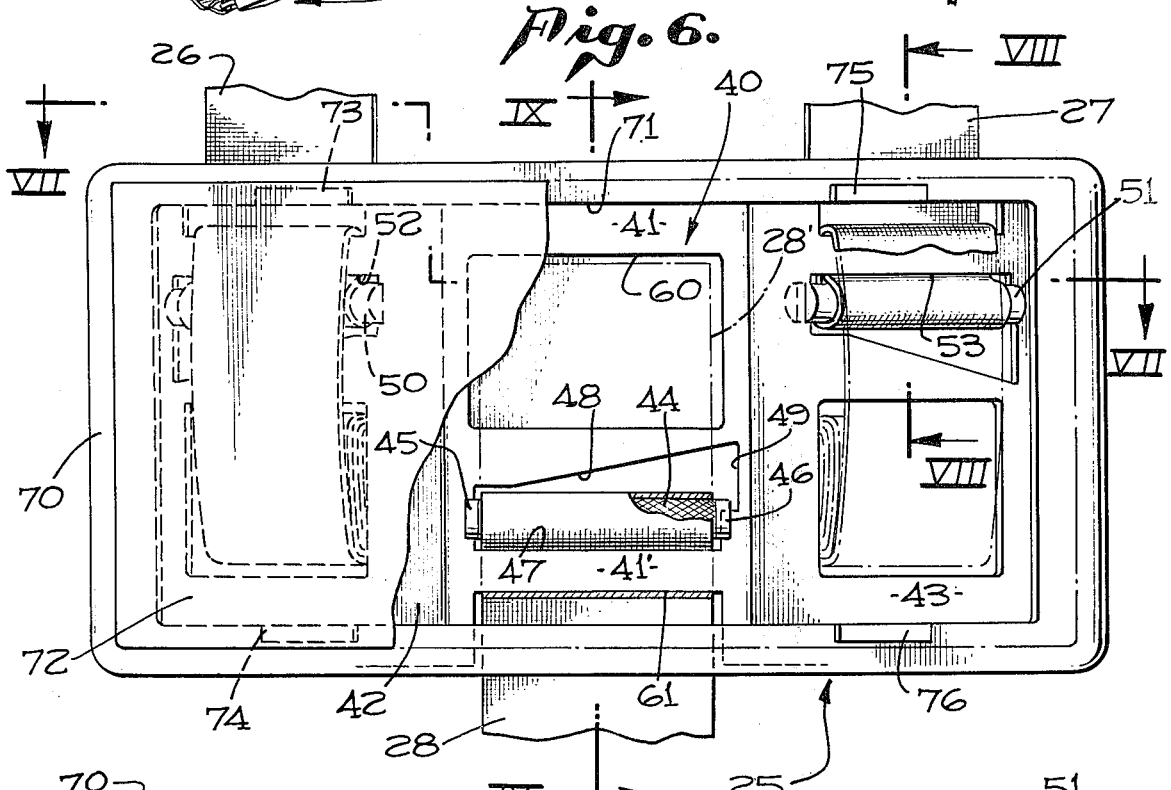
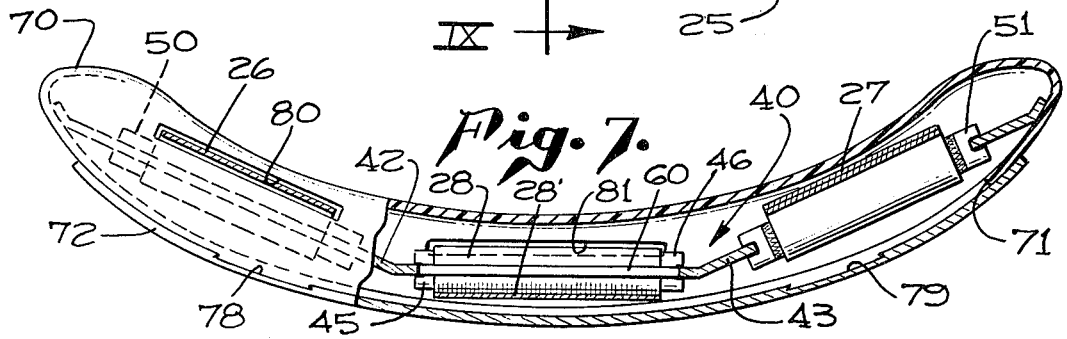

ABDOMINAL RESTRAINT AND BELT STORAGE MEANS FOR CHILD SAFETY SEATS FOR VEHICLES

BACKGROUND OF THE INVENTION

This invention relates in general to child safety seat constructions and the means for restraining a child in such seat. More particularly, the present invention relates to an improvement in pelvic restraint means associated with a harness assembly mounted to the child safety seat.

Various types of child safety seat constructions have been devised heretofore for supporting and restraining infants and small children in the larger adult size seats normally provided in vehicles such as passenger automobiles in general use presently. The child or infant passenger is normally restrained in the child safety seat either by a harness mounted to the seat, with the seat in turn secured to the vehicle, or by a harness arrangement which is secured in non-load bearing relation to the child safety seat and in load bearing relation to anchor means associated with the vehicle structural members. In either case, it is common to provide a plurality of harness straps which connect somewhere in front of the child, in order to provide for shoulder and crotch straps of a harness restraint.

In prior constructions, the juncture of shoulder and crotch, and in some cases lap straps, has comprised a buckle or similar fitting for releasably connecting a plurality of straps via end connectors. However, infant or child passengers may inadvertently, in playing or just moving about, release or loosen the connection of these harness straps, particularly where the connection is placed immediately in front of the child or infant passenger. It would be possible to make such connections permanent connections with the release means located in a more inaccessible location, but such permanent connection of shoulder and crotch straps, by way of example, would detract from the adjustability of the harness assembly for locating a pelvic restraint member in the general pelvic area of the child passenger. The provision of belly pads or pelvic restraints heretofore has been recognized as being advantageous for restraining infant or child passengers as opposed to the presently used lap and chest belt straps only for adult passengers.

It is therefore the primary object of the present invention to disclose and provide an improvement in the means for connecting harness straps in a harness assembly in the area thereof fronting the pelvic area of a child or infant passenger to provide an improved pelvic restraint for such passenger.

It is another object of the present invention to disclose and provide an anchor member, and means thereon for adjustably anchoring the free ends of associated harness straps to the member, to operably connect the harness straps in relatively adjustable anchored relation and provide a housing about the anchor member and means for adjustably anchoring the harness straps to render the strap ends and adjustment means generally inaccessible to a child passenger restrained by the harness yet provide for easy access thereto by an adult passenger who may wish to adjust the location of the anchor member relative to the child to place the restraint provided thereby in the pelvic region of the child passenger.

It is another object of the present invention to disclose and provide an improvement in pelvic restraint means for use in a child safety harness associated with child safety seats for use in vehicles wherein a load bearing member is provided within a resilient housing having smooth exterior surfaces to provide for the spreading of associated harness strap loading upon the child in the pelvic region and wherein such assembly of load bearing means and housing is adjustable relative to the housing straps in order to locate them in the desired pelvic frontal area relative to the infant or child passenger.

SUMMARY OF THE INVENTION

Generally stated, the improvement in pelvic restraint means in accordance with the present invention comprises the provision of an anchor member and means thereon for adjustably anchoring the free ends of child safety harness straps to the member to operably connect such straps in relatively adjustable anchored relation, and to thereby adjustably mount the anchor member to the harness. A housing means is provided to enclose the anchor member, the means for adjustably anchoring the free ends of the straps and the strap ends themselves in order to render all of the same generally inaccessible to a child passenger seated in the child safety seat. The housing is preferably formed of a resilient plastic material with a smooth resilient load spreading surface facing toward a child restrained by the harness. Webbing storage means are provided within the housing for storing excess webbing accumulated do to the adjustability of the anchoring means for the harness straps.

More specifically, the improvement in pelvic restraint means according to the present invention is intended for use in a harness assembly for a child safety seat for use in vehicles wherein the harness assembly is anchored to the child safety seat, the child safety seat in turn being anchored to the vehicle seat. A load bearing plate means is provided for attachment to the harness straps with such plate means including one or more anchor slot means with associated webbing snubber bars positioned therein for receiving and adjustably anchoring the associated harness strap ends. Additional aperture means are provided in the plate means for receiving and storing excess webbing which is entrained around the snubber bars, around portions of the plate and then stored in the aforementioned additional, or webbing storage apertures. A resilient housing, with a movable cover member, encloses the load bearing plate means and associated snubber bars, webbing storage apertures and harness strap ends to render them generally inaccessible to a child passenger. Slots are provided in the housing to allow the harness straps to pass therethrough to the enclosed load bearing plate means. The pelvic restraint means presents a resilient, smooth exterior surface toward the child which can be adjusted relative to the associated harness to place the same in a frontal area toward the pelvic region of the child to be restrained.

A more complete understanding of the present invention, as well as a recognition of additional advantages and objects thereof, will be afforded to those skilled in the art from a consideration of the following detailed description of a preferred exemplary embodiment of the improved pelvic restraint means in accordance with the present invention. Reference will be made to the appended sheets of drawings in which like numbers in the various figures indicate like parts. Before commencing the detailed description of the preferred exemplary embodiment, a brief description of the drawings will be made.

BRIEF DESCRIPTION OF THE DRAWINGS

FIG. 1 is a perspective view of an exemplary embodiment of child safety seat including a preferred exemplary embodiment of improvement in pelvic restraint means according to the present invention;

FIG. 2 is a side view, in section, of the child safety seat and improvement in pelvic restraint means of FIG. 1;

FIG. 3 is a detail view of a portion of the child safety seat of FIG. 2 taken therein along the plane III—III;

FIG. 4 is a detail section view taken in FIG. 3 along the plane IV—IV;

FIG. 5 is a perspective view of the preferred exemplary embodiment of improvement in pelvic restraint means according to the present invention shown apart from the exemplary embodiment of child safety seat;

FIG. 6 is a frontal view, partially in section, of the preferred exemplary embodiment of improvement in pelvic restraint means of FIGS. 1, 2 and 5;

FIG. 7 is a horizontal, partly sectional, view of the pelvic restraint means of FIG. 6 taken therein along the plane VII—VII;

FIG. 8 is a detail section view of the pelvic restraint means of FIG. 6 taken therein along the plane VIII—VIII; and FIG. 9 is a vertical section view of the pelvic restraint means of FIG. 6 taken therein along the plane IX—IX.

DESCRIPTION OF THE PREFERRED EMBODIMENT

Referring first to FIG. 1, an exemplary embodiment of child safety seat 10 is shown seated upon a vehicle seat 11 against the vehicle seat backrest 12. The exemplary child safety seat 10 is preferably of a one piece molded plastic construction, as known in the art, with a pedestal type base 13 to place the child seating area, indicated generally at 14, spaced somewhat above the vehicle seat 11.

As more fully described in the co-pending application Ser. No. 471,457 filed May 20, 1974 entitled "Child Safety Seat For Vehicles With Improved Seat Restraining Means," the exemplary child seat is provided with load bearing surfaces 15 and 16 in the general area of the juncture of the seat and back side wall portions over which a pre-existing vehicle associated safety belt 17 is passed to hold the child safety seat in a restrained position of use in the vehicle. Safety belt 17, as is known in the art, may include a first strap 18 connected to a vehicle anchored automatic locking retractor mechanism (not shown) at one end with a tongue plate 19 at the other end for releasable engagement with a buckle 20. Buckle 20, may be constructed in accordance with U.S. Pat. No. 3,790,994, or other prior art buckles, and is anchored via strap 21 to the vehicle.

As best seen in FIGS. 3 and 4, the load bearing surfaces 15 and 16 of the exemplary embodiment of child seat, and as more fully explained in the aforesaid co-pending application, are provided with means for increasing the coefficient of friction of each surface to increase the frictional gripping of the surface engagement between the passenger seat belt and the child safety seat load receiving surfaces. In the exemplary embodiment, such means comprise the provision of a plurality of grooves 22 formed integrally of the child safety seat side walls in the substantially flat surface areas of the load receiving surfaces. Grooves 20 preferably lie in a direction transverse to the direction the seat belt 18 travels about the child safety seat. The child safety seat 10 may thereby be both vertically and laterally restrained by the placing of belt 18 about the seat, on load bearing surfaces 15 and 16, and tightening strap 18 down thereon via the associated buckle 20. As is known in the art, the associated automatic locking retractor will pull the left hand end (in FIG. 1) of strap 18 snugly down on surfaces 15 and 16.

As is particularly contemplated within the present invention, an improvement in pelvic restraint means, indicated generally at 25, is shown in association with a pair of harness straps 26 and 27, respectively, and a crotch strap 28. As best seen in FIGS. 1 and 2, the shoulder straps 26 and 27 pass through a pair of apertures 29 and 30 formed in seat back 31 to a common sewn connection at 32 with a back strap 33. The configuration of harness straps 26, 27, 28 and 33 may be seen in FIG. 5 apart from the vehicle seat.

As more fully disclosed in the co-pending application Serial No. 471,465 filed May 20, 1974 entitled "Child Safety Seat for Vehicles With Harness Release Inaccessible To Child Passenger," the buckling means, indicated generally at 35, for the harness straps is preferably located within a buckle receiving cavity 36 formed integrally of the base 13 of the child safety seat. The buckle means, indicated generally at 35, may comprise the push button type buckle of U.S. Pat. No. 3,790,994 and in general include a tongue plate 37, connected to crotch strap 28, which is releasably connectable via push button 38 to a through load member (not shown) within buckle housing 39, which is connected to the back strap 33. As seen in FIG. 2, the location of the harness buckle means, indicated generally at 35, within the recessed cavity 36 formed in base 13 places the buckle means in a generally inaccessible location relative to the child passenger, while providing for easy access to other passengers, such as an adult who may wish to quickly release the child passenger, particularly in the event of an emergency.

As generally explained hereinbefore, the child passenger is preferably restrained in the child safety seat via the harness arrangement of straps 26 through 28 and 33 with the child and seat being restrained upon the vehicle seat by the pre-existing vehicle safety belt 17. Such arrangement allows use of the child safety seat both in the vehicle, and out of it, with a harness for restraining the child in the seat in a supported position. However, the provision of harness straps as aforedescribed presents a plurality of strap ends, i.e. the free ends of straps 26, 27 and 28, in the general pelvic area of the child to be restrained. The pelvic area is also the area where considerable loading may be applied to a child passenger's body in the event of a sudden deceleration of the vehicle in the event of an emergency situation experienced by the vehicle. As will now be explained in detail, the present improvement in pelvic restraint means provides for a spreading of the loading on the child's pelvic area by the harness and, importantly, provides for a strong, reliable load transmitting connection between the associated harness straps with provision for storing the excess webbing of the strap ends within an associated housing. Referring to FIGS. 6 and 7, in the exemplary embodiment, the load bearing plate means for attachment to the safety belt straps of the harness comprises a load bearing plate, indicated generally at 40, including a generally planar central portion 41 and laterally extending side portions 42 and 43, the latter being angled somewhat relative to the central portion 41 as best seen in FIG. 7. Such configuration of the load bearing plate, indicated generally at 40, is provided to facilitate transfer of loading between the harness and child passenger in the child safety seat.

Means are provided for adjustably connecting each of the harness straps 26, 27 and 28 to the load bearing plate means indicated generally at 40. In the exemplary embodiment, such means comprises the provision of a plurality of webbing adjustment snubber or locking bars mounted in associated mounting slots provided in the plate means. Referring specifically to FIGS. 6 and 7, it can be seen that crotch strap 28 is entrained about a knurled snubber bar 44 mounted by its slotted ends 45 and 46 in slot 47 formed in the central portion 41 of the load bearing plate means. Slot 47 is provided with a diverging upper wall 48 and a recess in right hand wall 49 (in FIG. 6) to facilitate insertion of the knurled bar 44 into the slot 47. As seen in FIG. 9, the webbing of strap 28 is passed over the top surface of bar 44, around its front surface and back through slot 47 beneath bar 44. A downward pull on strap 28 therefore pulls the snubber bar 44 downwardly in FIGS. 6 and 9 to snub or lock the strap 28 against the upper surface of the lower part 41' of plate mid portion 41. Harness straps 26 and 27 are similarly adjustably anchored to load or snubber bars 50 and 51, respectively which are mounted in associated slots 52 and 53, provided in load bearing plate portions 42 and 43, respectively. The construction, arrangement and mode of operation for adjustably anchoring harness straps 26 and 27 is the same as that heretofore described with regard to strap 28, though laid out in an opposite direction as seen in FIG. 6.

Means are provided for storing the excess webbing of the strap ends adjustably anchored to the load bearing plate means of the present invention. In the exemplary embodiment, as best seen in FIGS. 6 and 9, the load bearing plate, indicated generally at 40, is provided with webbing receiving apertures in areas thereof adjacent each of the snubber bar receiving slots 47, 52 and 53. Referring specifically to FIG. 6, by way of example, plate portion 41 is provided with a webbing receiving aperture 60 into which the somewhat rolled up webbing 28' of the free end of strap 28 is stored. Similar webbing receiving apertures are provided in plate portions 42 and 43, below the associated slots 52 and 53 for receiving the free ends of the associated adjustably anchored harness straps 26 and 27 in like manner. Thus, the ends of harness straps 26, 27 and 28 are not only adjustably anchored to the load bearing plate means, indicated generally at 40, but the excess webbing present is conveniently stored in the webbing apertures of the plate within a surrounding housing 70.

The lower portion 41' of plate means midportion 41 is provided with a guide recess 61 for guiding, and providing clearance relative to the surrounding housing to be hereinafter described, strap 28 up about portion 41' to the webbing storage aperture 60. The anchored strap end is thus wound about and stored in the plate means 40 as described.

Housing 70, in the preferred exemplary embodiment, is made of plastic material suitable for injection molding with a wall thickness therefor on the order of approximately 0.060 to 0.090 inches. Through the use of such plastics, known in the art, a fairly flexible walled housing may be provided for enclosing the load bearing plate means indicated generally at 40 and its associated adjustable strap anchoring means and strap ends.

In order to provide for accessibility to the strap ends of the harness anchored to the load bearing plate means, the housing preferably is provided with a frontal opening 71 through which the strap ends, and associated locking or snubbing bars 47, 50 and 51 may be manipulated. A cover 72 is provided for closing opening 71 and may be molded integrally of the housing 70, or as in the exemplary embodiment, be provided as a separate cover member which is releasably keyed to housing 70. As best seen in FIGS. 6 and 7, a plurality of key members 73, 74, 75 and 76 may be provided on the housing 70 for releasable interlocking engagement with mating key ways formed in cover 70 as key ways 78 and 79 seen in FIG. 7.

Housing 70 is provided with strap slots 80, 81 and 82 to facilitate passage of harness straps 26, 27 and 28 through the housing and into the chamber formed interiorly of the housing 70 and its cover 72. The plastic housing described, in co-operation with the harness straps 26, 27 and 28 and load bearing plate means, functions to spread the load imparted to the pelvic region of a child seated in the child safety seat in the event of a sudden deceleration of the vehicle.

The exterior surfaces of the housing, particularly the rear surface 80, are preferably smooth and flexible to minimize any potential bruising or cutting otherwise possible due to contact between the child passenger and an unprotected connection of the harness straps in this location. The flexible plastic walls of the housing, constructed as aforedescribed, also prevent contact between the child passenger and the adjustment means for anchoring the strap ends, the knurled bars 44, 50 and 51, while enclosing them and thus reducing the likelihood that a child passenger might inadvertently loosen or release the harness straps relative to the load bearing plate means indicated generally at 40.

Having thus described a preferred exemplary embodiment of the improvement in plevic restraint means, in accordance with the present invention, it should be apparent to those skilled in the art that the within improvement attains the advantages and objects stated therefor in the introductory portions of the within disclosure. It should also be noted by those skilled in the art that various modifications, alternative embodiments and variations of the within exemplary embodiment may be made within the scope of the present invention which is defined and limited only by the following claims.

I claim:

1. In a harness assembly for a child safety seat for use in vehicles wherein the harness assembly includes at least three straps adjustably connected together in a location in front of a child seated in said seat, the improvement comprising the provision of:

an anchor member and means thereon for anchoring and adjusting the length of the free ends of said straps to said member to operably connect said straps in relative length adjustable anchored relation; and housing means for enclosing said anchor member, anchoring means and strap ends to render the same inaccessible to a child passenger seated in said child safety seat.

2. The improvement of claim 1 wherein:

said housing means is formed of a resilient plastic material suitable for injection molding and presents a smooth resilient load spreading surface toward a child seated on the child safety seat.

3. The improvement of claim 1 wherein:

said anchor member is also provided with webbing storage aperture means therein for receiving and storing excess webbing of said straps.

4. In a child safety seat harness assembly including a pelvic restraint means, the improvement in pelvic restraint means comprising the provision of:

load bearing plate means for attachment to safety belt straps of said harness, said plate means including one or more anchor slot means with an associated webbing snubber bar positioned therein for receiving, providing for strap length adjustment and anchoring one or more harness strap ends to said plate means; and webbing storage aperture means in said plate means for receiving and storing excess webbing of said one or more strap ends said webbing storage means including an aperture positioned in said plate means generally adjacent to each said anchor slot means.

5. The provision in child safety seat harness of claim 4 wherein said pelvic restraint means comprises:

resilient material housing means for receiving and enclosing said plate means and associated harness strap ends, said housing having strap receiving slots therethrough to facilitate the connection of said harness strap ends through said housing to said enclosed plate means.

6. The provision in child safety seat harness of claim 5 wherein said pelvic restraint means comprises:

a frontal opening through said housing means for manipulation of said harness strap ends within said housing, a cover member positioned over said frontal opening and means associated with said housing means and said cover member for removably retaining said cover member to said housing means.

* * * * *